United States Patent
Saffari

(10) Patent No.: US 7,758,420 B2
(45) Date of Patent: Jul. 20, 2010

(54) GAMING MACHINE WITH PROMOTIONAL ITEM DISPENSER

(75) Inventor: Ali Saffari, Reno, NV (US)

(73) Assignee: IGT, Reno, NV (US)

( * ) Notice: Subject to any disclaimer, the term of this patent is extended or adjusted under 35 U.S.C. 154(b) by 850 days.

(21) Appl. No.: 11/586,950

(22) Filed: Oct. 25, 2006

(65) Prior Publication Data

US 2007/0049373 A1 Mar. 1, 2007

Related U.S. Application Data

(63) Continuation of application No. 09/951,837, filed on Sep. 12, 2001, now Pat. No. 7,128,650.

(51) Int. Cl.
*A63F 9/24* (2006.01)

(52) U.S. Cl. ............... 463/25; 463/12; 463/13; 463/20; 463/29; 463/42; 705/14.1; 705/14.12; 705/14.27; 705/14.28

(58) Field of Classification Search .............. None
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,467,424 A | 8/1984 | Hodges | |
| 4,856,787 A | 8/1989 | Itkis | |
| 4,930,073 A | 5/1990 | Cina, Jr. | |
| 5,283,734 A | 2/1994 | Von Kohorn | |
| 5,321,241 A | 6/1994 | Craine | |
| 5,342,047 A | 8/1994 | Heidel et al. | |
| 5,393,061 A | 2/1995 | Manship et al. | |
| 5,398,932 A | 3/1995 | Eberhardt et al. | |

(Continued)

FOREIGN PATENT DOCUMENTS

EP 0 307 925 9/1988

(Continued)

OTHER PUBLICATIONS

General type of conventional gaming machine described in "Background of the Invention" section of patent application.

(Continued)

*Primary Examiner*—M. Sager
(74) *Attorney, Agent, or Firm*—Weaver Austin Villeneuve Sampson LLP

(57) ABSTRACT

A gaming apparatus is provided with a display unit, a promotional credit member processing apparatus, and a controller that may be programmed to allow a person to obtain a first number of promotional gaming credits in response to processing of a promotional credit member by the promotional credit member processing apparatus, to allow a person to make a wager using at least one of the promotional gaming credits, and to cause a video image representing a game to be generated on the display unit. The controller may also be programmed to determine a second number of promotional gaming credits based on the first number of promotional gaming credits based on the first number of promotional gaming credits and at least one wager and to cause the promotional credit member processing apparatus to record the second number of promotional gaming credits on a promotional credit member.

21 Claims, 15 Drawing Sheets

U.S. PATENT DOCUMENTS

| | | | |
|---|---|---|---|
| 5,470,079 A | 11/1995 | LeStrange et al. | |
| 5,559,312 A | 9/1996 | Lucero | |
| 5,575,374 A | 11/1996 | Orus et al. | |
| 5,643,086 A | 7/1997 | Alcorn et al. | |
| 5,737,418 A | 4/1998 | Saffari et al. | |
| 5,769,716 A | 6/1998 | Saffari et al. | |
| 5,816,918 A | 10/1998 | Kelly et al. | |
| 5,855,515 A | 1/1999 | Pease et al. | |
| 5,902,983 A | 5/1999 | Crevelt et al. | |
| 5,941,771 A | 8/1999 | Haste et al. | |
| 6,048,269 A | 4/2000 | Burns et al. | |
| 6,062,981 A | 5/2000 | Luciano, Jr. | |
| 6,113,098 A | 9/2000 | Adams et al. | |
| 6,113,492 A * | 9/2000 | Walker et al. | 463/16 |
| 6,227,972 B1 | 5/2001 | Walker et al. | |
| 6,244,958 B1 | 6/2001 | Acres | |
| 6,371,852 B1 | 4/2002 | Acres | |
| 6,431,983 B2 | 8/2002 | Acres | |
| 6,443,452 B1 | 9/2002 | Brune | |
| 6,471,590 B2 | 10/2002 | Saunders | |
| 6,511,377 B1 | 1/2003 | Weiss | |
| 6,547,664 B2 | 4/2003 | Saunders | |
| 6,558,255 B2 | 5/2003 | Walker et al. | |
| 6,589,115 B2 | 7/2003 | Walker et al. | |
| 6,676,515 B1 * | 1/2004 | Baltz et al. | 463/25 |
| 6,923,721 B2 | 8/2005 | Luciano et al. | |
| 7,025,674 B2 | 4/2006 | Adams et al. | |
| 7,128,650 B2 * | 10/2006 | Saffari | 463/25 |
| 2001/0012796 A1 | 10/2001 | Walker | |
| 2001/0027126 A1 | 10/2001 | Saunders | |
| 2003/0008707 A1 | 1/2003 | Walker et al. | |
| 2003/0083943 A1 | 5/2003 | Adams | |
| 2003/0092477 A1 | 5/2003 | Luciano et al. | |
| 2003/0153377 A1 | 8/2003 | Lisowski | |

FOREIGN PATENT DOCUMENTS

| | | |
|---|---|---|
| WO | WO 99/19027 | 4/1999 |
| WO | WO 02/23491 | 3/2002 |

OTHER PUBLICATIONS

First type of conventional gaming machine describe in "Background of the Invention" section of patent application.

Second type of conventional gaming machine described in "Background of the Invention" section of patent application.

Communication form the European Patent Office dated Aug. 4, 2003 enclosing a European Search Report.

* cited by examiner

FIG. 10
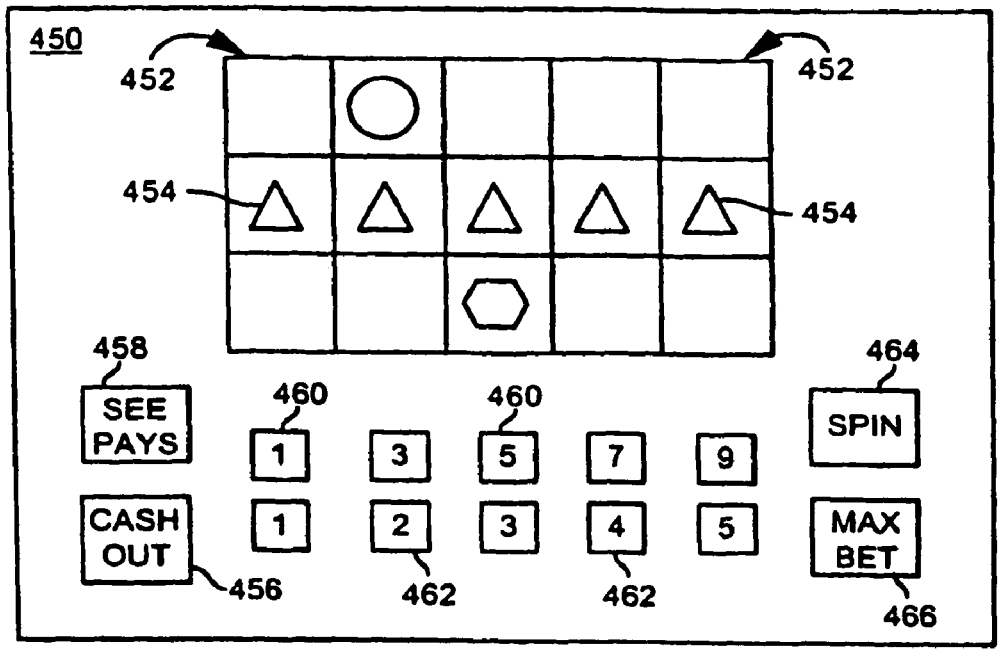
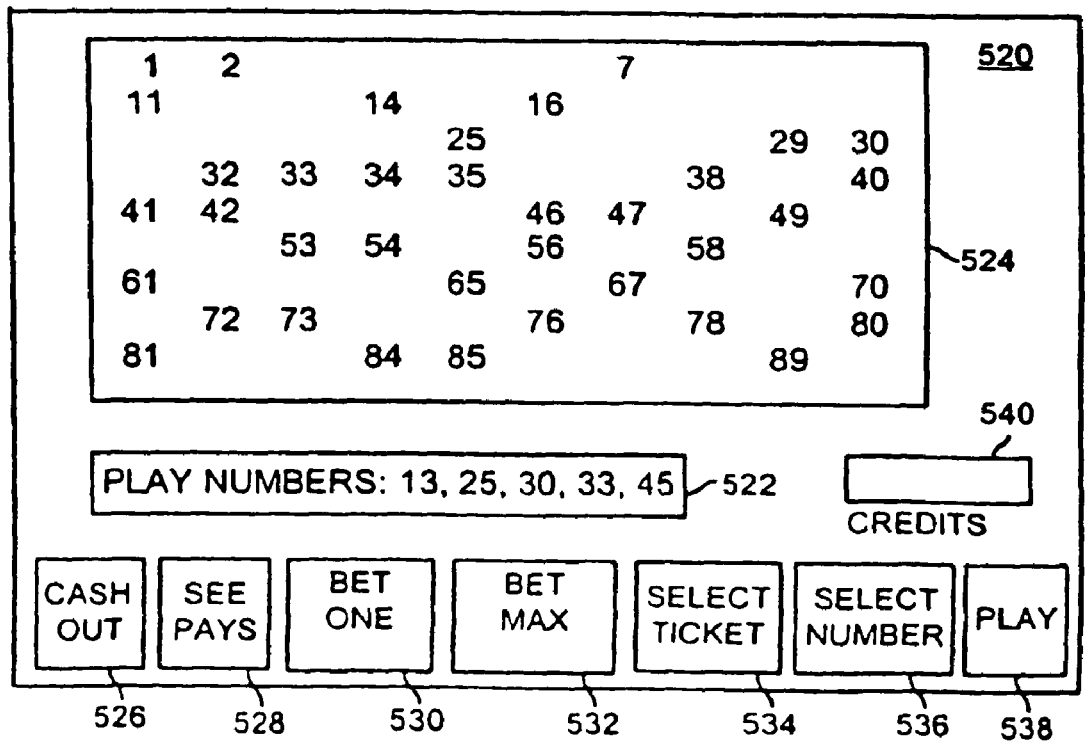
FIG. 11

GAMING MACHINE WITH PROMOTIONAL ITEM DISPENSER

RELATED APPLICATION DATA

This application claims priority under U.S.C. 120 and is a continuation of U.S. application Ser. No. 09/951,837, filed Sep. 12, 2001, titled, "GAMING MACHINE WITH PROMOTIONAL ITEM DISPENSER," by Saffari, et al, to issue as U.S. Pat. No. 7,128,650, which is incorporated herein in its entirety and for all purposes.

FIELD OF THE INVENTION

The present invention is directed to a gaming machine of the type that may be found in a casino.

BACKGROUND OF THE INVENTION

A general type of conventional gaming machine has been provided with a display unit that is capable of generating video images, a value-input device, and a controller with a memory and a processor that controls the overall operation of the gaming machine. The controller was programmed to allow a person to make a wager, to cause video images to be generated on the display unit, to determine an outcome of the game, and to determine a value payout associated with the outcome of the game. The conventional gaming machine was programmed to display video images representing a game, which included a number of user-selectable games including video poker, video blackjack, video slots, video keno and video bingo.

A first type of conventional gaming machine of the general type noted above was provided with a plurality of value-input devices including a coin acceptor and a ticket reader. The ticket reader was capable of reading a promotional ticket that was issued by a casino and that had data recorded thereon that represented a given number of promotional gaming credits and a validation number. Upon the promotional ticket being inserted into the ticket reader, the ticket reader would read the data on the ticket and check the validity of the validation number with a central computer operatively coupled to the gaming machine. Upon receiving confirmation from the central computer that the validation number was valid, the gaming machine would give the player the number of promotional gaming credits specified by the promotional ticket, thus allowing the player to commence play on the gaming machine. When using such a promotional ticket, the player was required to use all of the promotional gaming credits on a single gaming machine.

A second type of conventional gaming machine of the general type noted above was provided with a magnetic card reader that was capable of reading a player tracking card. The player tracking card had magnetic data encoded thereon that included data representing the identity of a player. The second type of conventional gaming machine was operatively coupled to a central casino computer. In some cases, the casino would award a player promotional gaming credits, in which case data representing those gaming credits was stored in the central casino computer. The player tracking card did not have any data representing a number of promotional gaming credits recorded thereon. When the player to whom the credits were awarded inserted his or her player tracking card into the card reader of the second type of conventional gaming machine, that gaming machine would read data from the player tracking card and transmit player identification data to the central casino computer. The central casino computer would then cause the gaming machine to award to the player the number of promotional gaming credits stored in the central casino computer. When the player was finished playing, the gaming machine transmitted data to the central casino computer representing the number of promotional credits used by the player, and the central casino computer would then decrease the initial number of promotional credits awarded by the number used. The player could then use the remaining promotional gaming credits by playing a different gaming machine.

SUMMARY OF THE INVENTION

In one aspect, the invention is directed to a gaming apparatus having a display unit that is capable of generating video images, a promotional credit member processing apparatus, and a controller operatively coupled to the display unit and the promotional credit member processing apparatus that comprises a processor and a memory operatively coupled to the processor. The controller may be programmed to allow a person to obtain a first number of promotional gaming credits in response to processing of a promotional credit member by the promotional credit member processing apparatus, to allow a person to make a wager using at least one of the promotional gaming credits, and to cause a video image representing a game to be generated on the display unit. The controller may also be programmed to determine a second number of promotional gaming credits based on the first number of promotional gaming credits and at least one wager and to cause the promotional credit member processing apparatus to record the second number of promotional gaming credits on a promotional credit member.

The controller may also be programmed to cause a video image to be generated on the display unit, the video image representing a game selected from the group of games consisting of video poker, video blackjack, video slots, video keno and video bingo. The video image may be an image of at least five playing cards if the game comprises video poker, an image of a plurality of simulated slot machine reels if the game comprises video slots, an image of a plurality of playing cards if the game comprises video blackjack, an image of a plurality of keno numbers if the game comprises video keno, and an image of a bingo grid if the game comprises video bingo.

The promotional credit member processing apparatus may comprise a card reader, and the promotional credit member processing apparatus may process the promotional credit member by reading the promotional credit member. The controller may be programmed to record the second number of promotional gaming credits on a recordable card that was inserted into the promotional credit member processing apparatus by the person prior to making at least one wager. The promotional credit member processing apparatus may comprise a ticket reader/printer, and the promotional credit member processing apparatus may processes the promotional credit member by optically reading the promotional credit member. The controller may be programmed to cause the ticket reader/printer to print an image that specifies the second number of promotional gaming credits on a ticket.

In another aspect, the invention is directed to a gaming method comprising: (a) processing a promotional credit member having a first number of promotional gaming credits encoded thereon with the use of a promotional credit member processing apparatus, (b) awarding a person the first number of promotional gaming credits in response to processing the promotional credit member, (c) storing data representing a wager made using at least one of the promotional gaming credits, (d) playing a game, (e) determining a second number of promotional gaming credits based on the first number of promotional gaming credits and at least one wager, and (f) causing the promotional credit member processing apparatus to record a promotional credit member with the second number of promotional gaming credits.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF THE INVENTION

Figure 1:
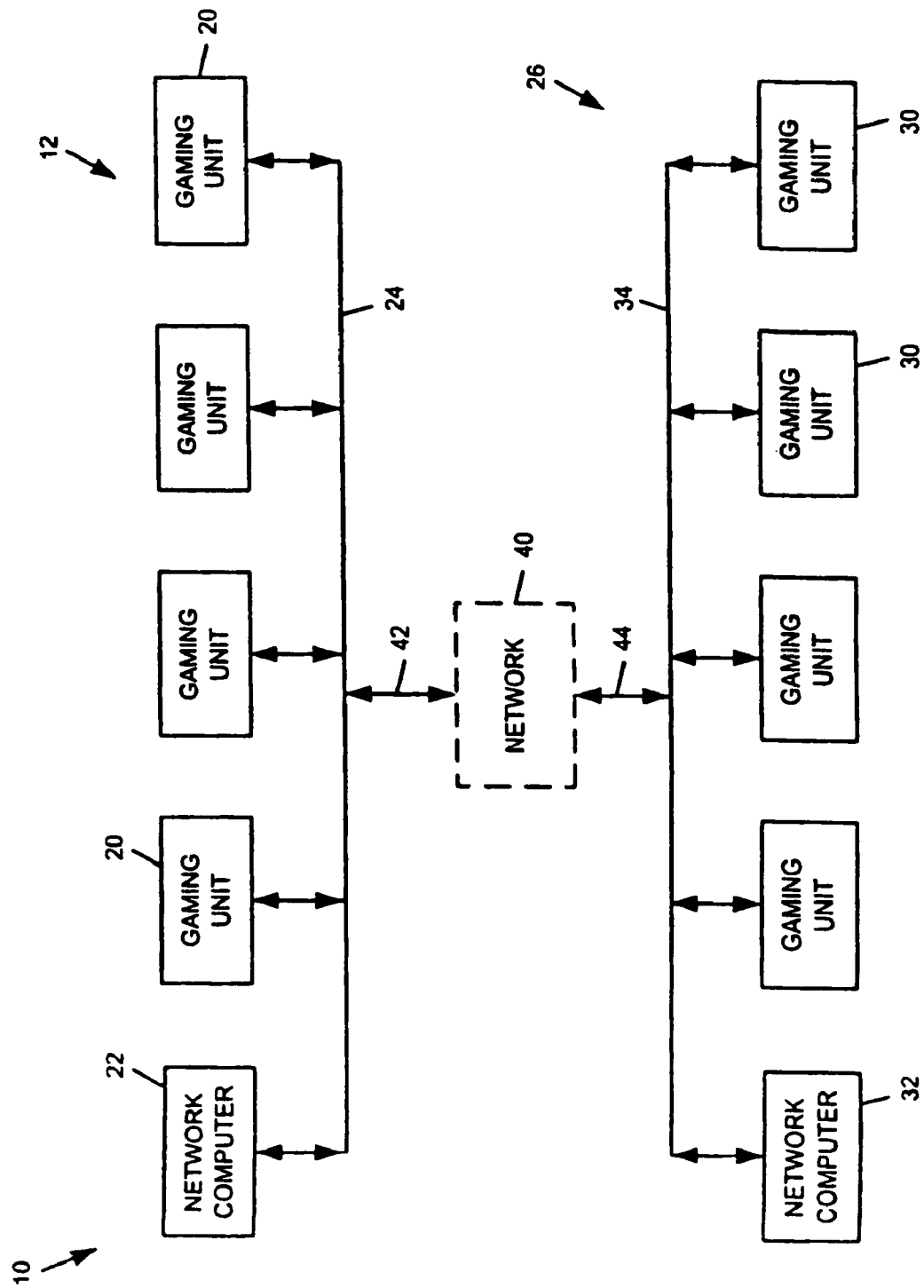
FIG. 1 is a block diagram of an embodiment of a gaming system in accordance with the invention.

FIG. 1 illustrates an embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
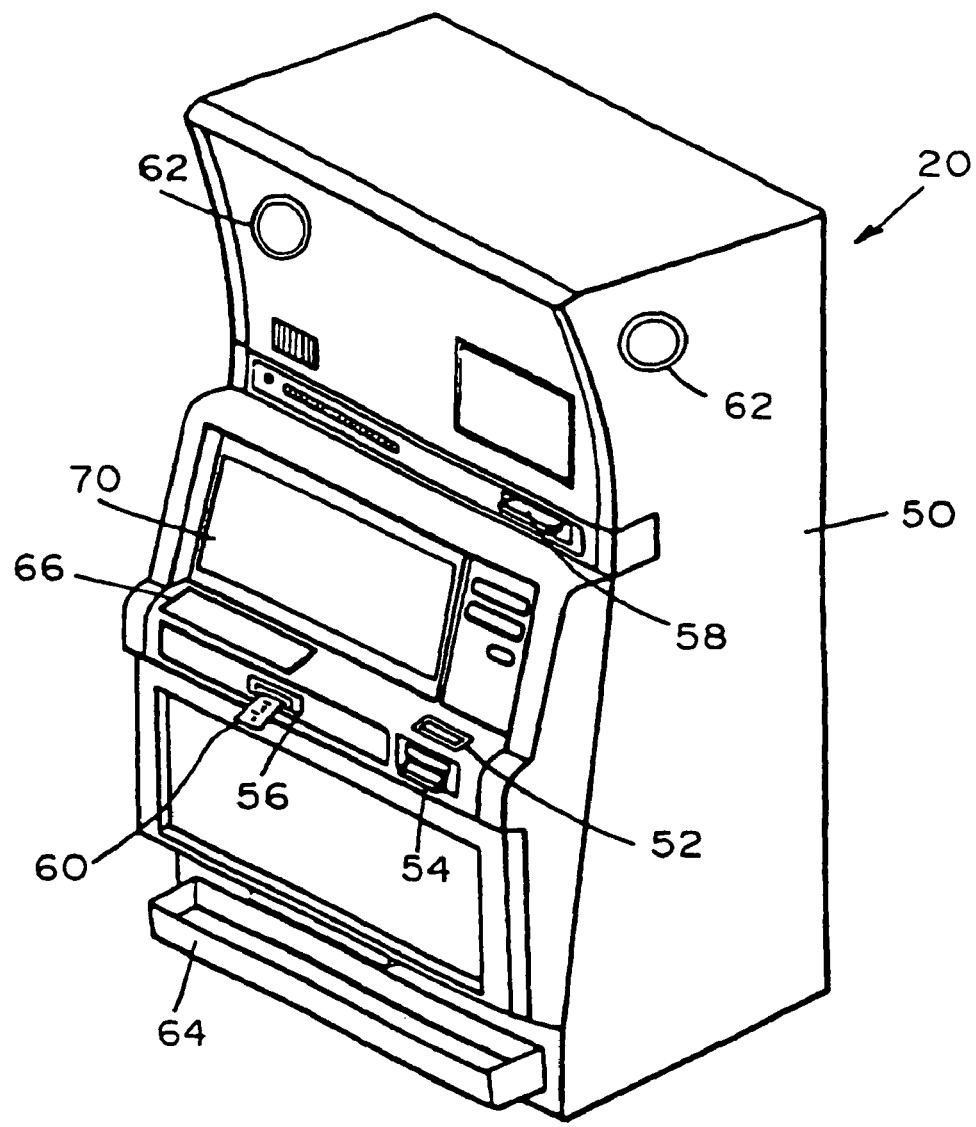
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, tickets, credit or debit cards, and any other object representative of value.

If provided on the gaming unit 20, the ticket reader/printer 56 may be used to read and/or print or otherwise encode tickets 60. The tickets 60 may be composed of paper or another printable or encodable material and may have one or more of the following informational items recorded thereon: the casino name, the type of ticket, a validation number, a bar code with control and/or security data, the date and time of issuance of the ticket, redemption instructions and restrictions, a description of an award, and any other information that may be necessary or desirable. Different types of tickets 60 could be used, such as bonus tickets, cash-redemption tickets, casino chip tickets, extra game play tickets, merchandise tickets, restaurant tickets, show tickets, etc. The tickets 60 could be optically recorded, such as by being printed with an optically readable material such as ink, or data on the tickets 60 could be magnetically encoded. The ticket reader/printer 56 may be provided with the ability to both read and print tickets 60, or it may be provided with the ability to only read or only record tickets 60. In the latter case, for example, some of the gaming units 20 may have ticket printers 56 that may be used to print tickets 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may accept promotional credit members, which may be in the form of visually recorded promotional tickets, magnetically encoded promotional cards or another form, which may be issued by casinos or other entities free-of-charge to encourage play of the gaming units 20. Regardless of the form, each promotional credit member may have a validation number recorded thereon and a number of promotional gaming credits recorded thereon. Depending on their form, the promotional credit members could be processed by the ticket reader/printer 56, the card reader 58, or some other type of processing apparatus.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
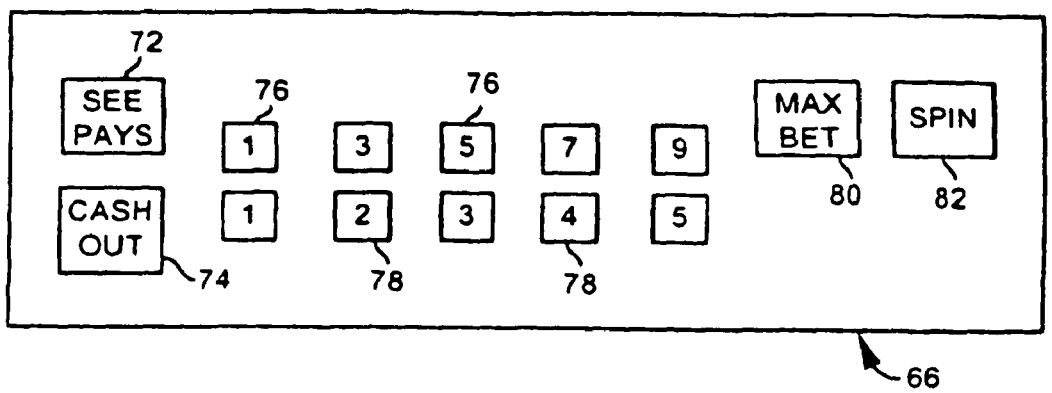
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
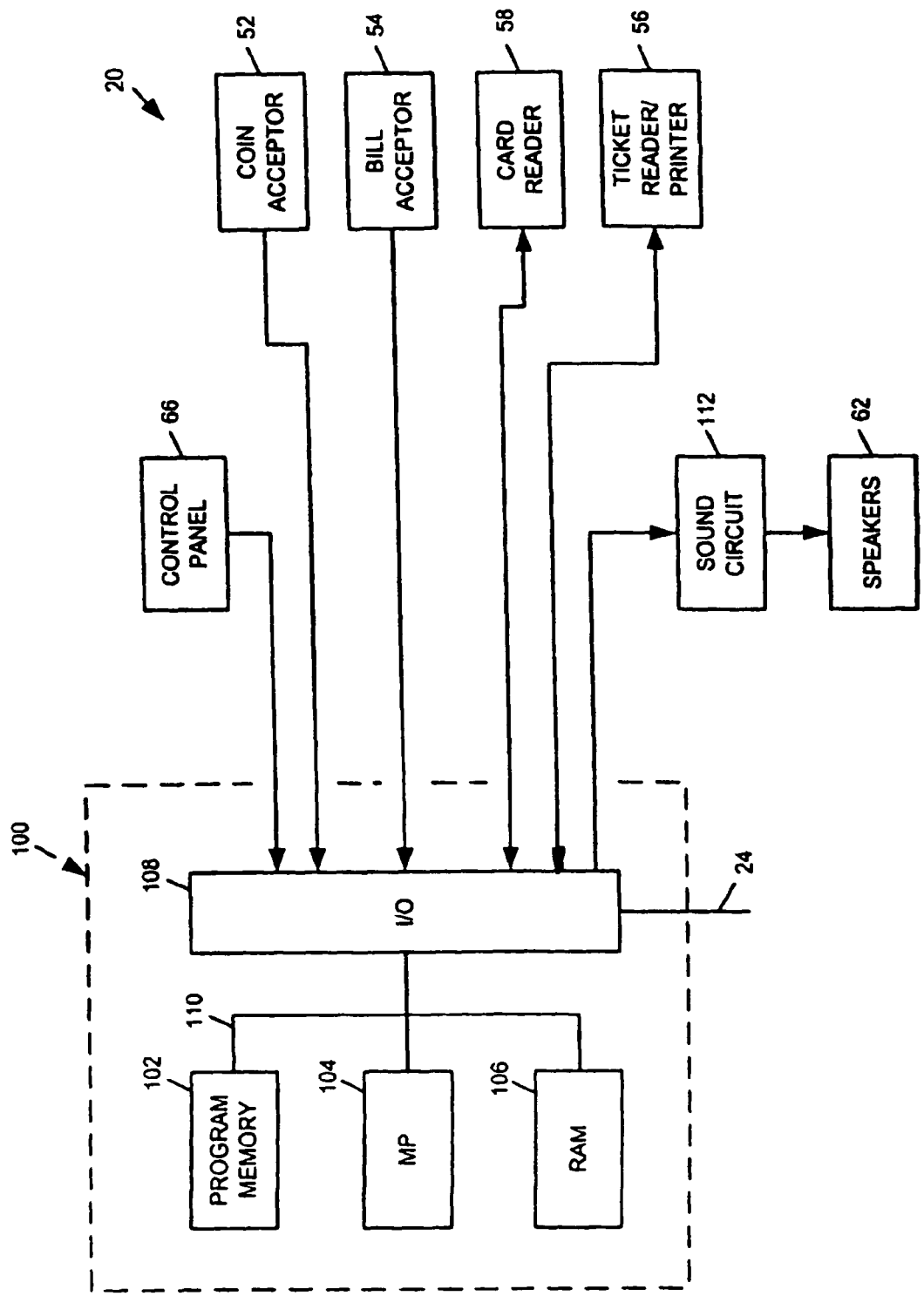
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 4A:
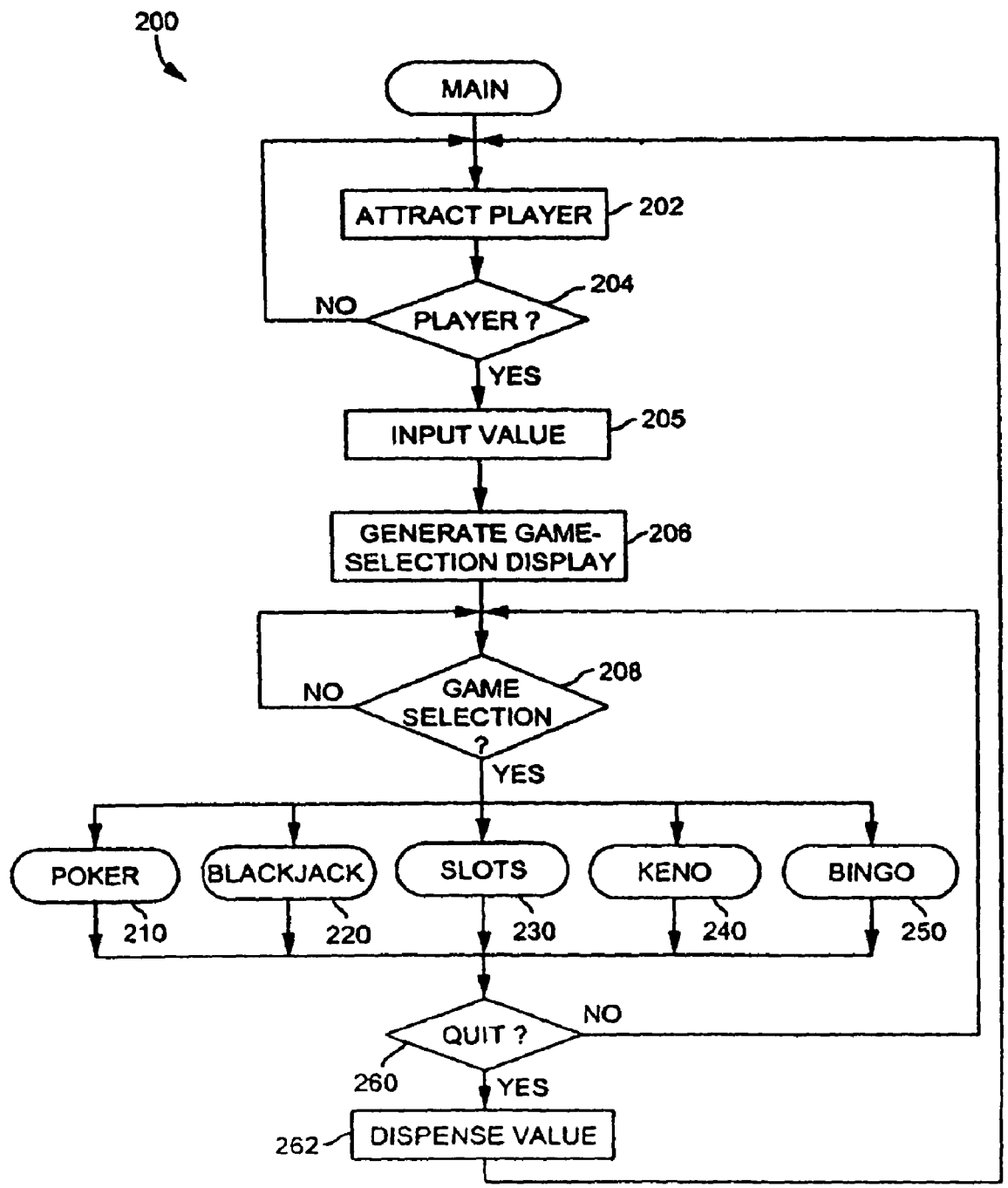
FIG. 4A is a flowchart of an embodiment of a main routine that may be performed during operation of one or more of the gaming units.

FIG. 4A is a flowchart of a main operating routine 200 that may be stored in the memory of the controller 100. Referring to FIG. 4A, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways, such as by detecting if the player pressed any button on the gaming unit 20. At block 205, value in the form of coins, paper currency, credit card authorizations, promotional credit members, etc. may be input to the gaming unit 20 via the coin acceptor 52, the bill acceptor 54, the ticket reader/printer 56, or the card reader 58.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4A, a different number of routines could be included to allow play of a different number of games. The gaming unit 20 may also be programmed to allow play of different games.

Figure 4B:
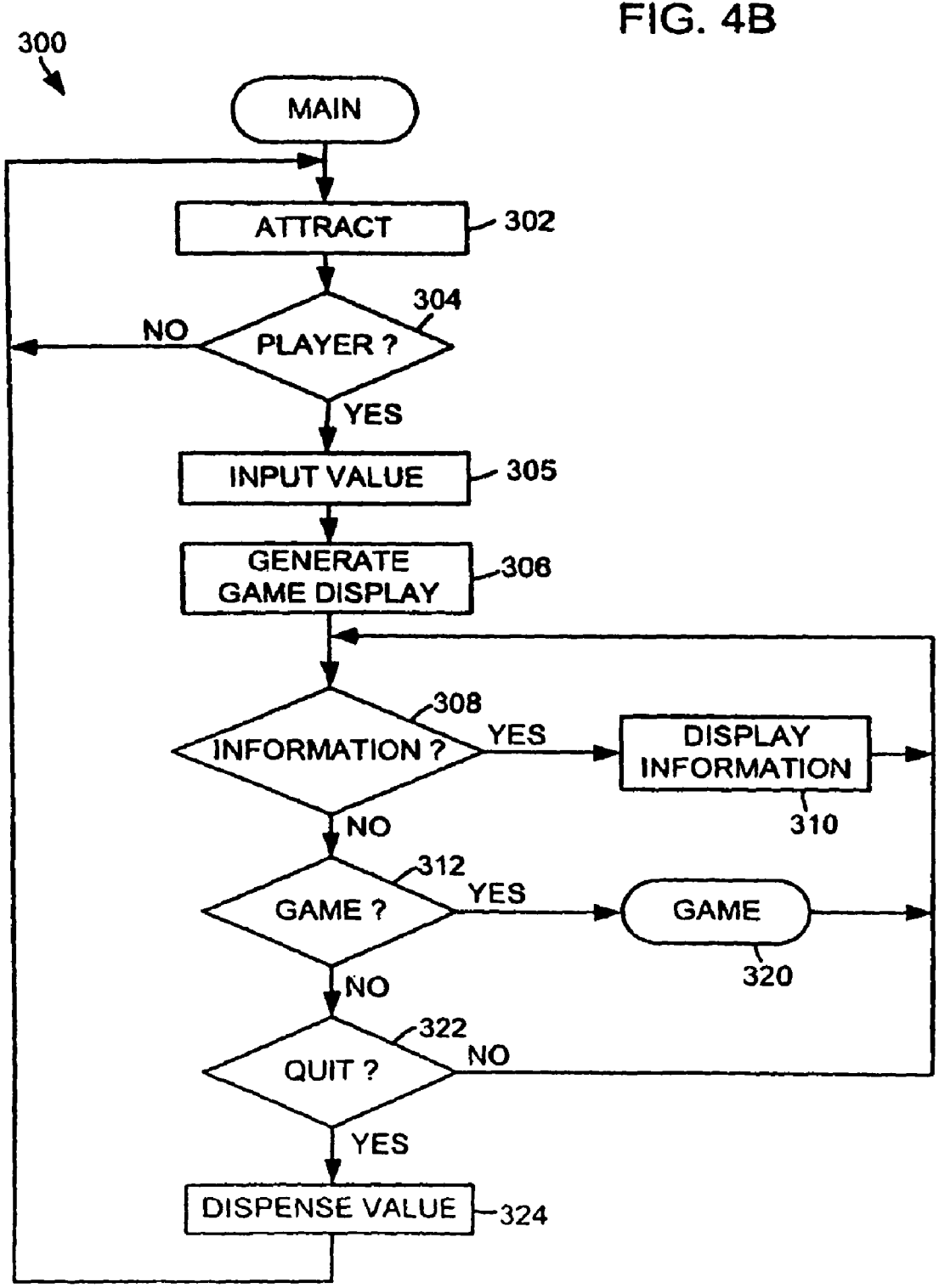
FIG. 4B is a flowchart of an alternative embodiment of a main routine that may be performed during operation of one or more of the gaming units.

FIG. 4B is a flowchart of an alternative main operating routine 300 that may be stored in the memory of the controller 100. The main routine 300 may be utilized for gaming units 20 that are designed to allow play of only a single game or single type of game. Referring to FIG. 4B, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated, value may be input at block 305, and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Input Value Routine

Figure 5A:
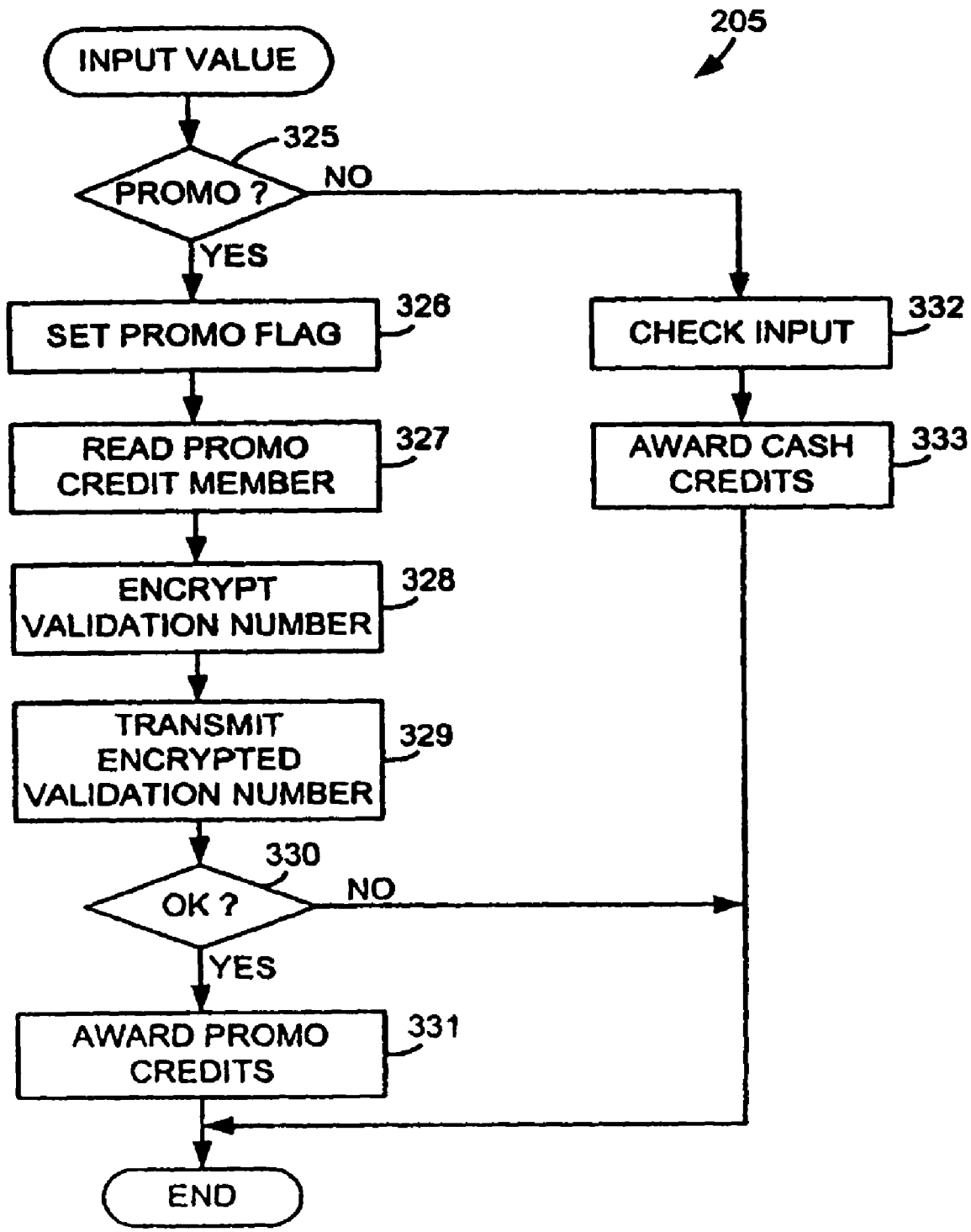
FIG. 5A is a flowchart of an embodiment of an input value routine that may be performed.

FIG. 5A is a flowchart of one embodiment of an input value routine 205 that could be performed at block 205 of FIG. 4A or at block 305 of FIG. 4B where the gaming unit 20 is designed to accept promotional credit members, such as promotional tickets or promotional cards, in addition to other forms of value such as cash.

Referring to FIG. 5A, the input value routine may begin at block 325 where the routine may determine if a promotional credit member was presented by a player. If a promotional credit member was presented (e.g. by inserting a promotional ticket into the ticket reader/printer 56 or by inserting a promotional card into the card reader 58), at block 326 the gaming unit 20 may set a "promotional" flag or variable to remember that the promotional credit member was presented instead of another form of value such as cash. At block 327, the promotional credit member may be read by the gaming unit 20 (e.g. by the ticket reader/printer 56 or the card reader 58) in order to ascertain the validation number associated with the promotional credit member and the number of gaming credits specified by the promotional credit member.

At block 328, the routine may cause the validation number read from the promotional credit member to be encrypted, using any suitable encryption method or scheme, and at block 329 the encrypted validation number may be transmitted from the gaming unit 20 to a central computer, such as the network computer 22 shown in FIG. 1. The validation number may be transmitted with error-detecting data, such as cyclic redundancy check (CRC) data, and/or error correcting data, to ensure that the validation number is transmitted correctly. The central computer to which the validation number is transmitted may check the validation number to ensure that it is valid, such as by checking the transmitted validation number against a list of validation numbers stored in memory. If the central computer determines that the transmitted validation number is valid, the central computer may transmit a validation signal confirming that fact to the gaming unit 20. Upon receiving a confirmation that the transmitted validation number is valid as determined at block 330, the routine may award at block 331 the number of promotional gaming credits that was specified by the promotional credit member and read by the gaming unit 20 at block 327.

If another form of value, such as cash or a credit card number, was input as determined at block 325, the routine may perform block 332 to check the validity of the value input. For example, where a credit card is inserted, the routine may check the status of the credit card and its associated credit limit. Assuming the results of the check at block 332 were okay, at block 333 the routine may award cash credits to the player.

The gaming unit 20 may be programmed to distinguish between promotional credits awarded at block 331 and cash credits awarded at block 333. For example, where a casino gives a promotional credit member having a number of gaming credits recorded thereon to a player, it may undesirable to allow the player to play a single game and receive cash for the remaining gaming credits. Thus, the gaming unit 20 may be programmed not to dispense cash based on promotional gaming credits and may be programmed to allow use of the promotional gaming credits only for play of the gaming unit 20.

Dispense Value Routine

Figure 5B:
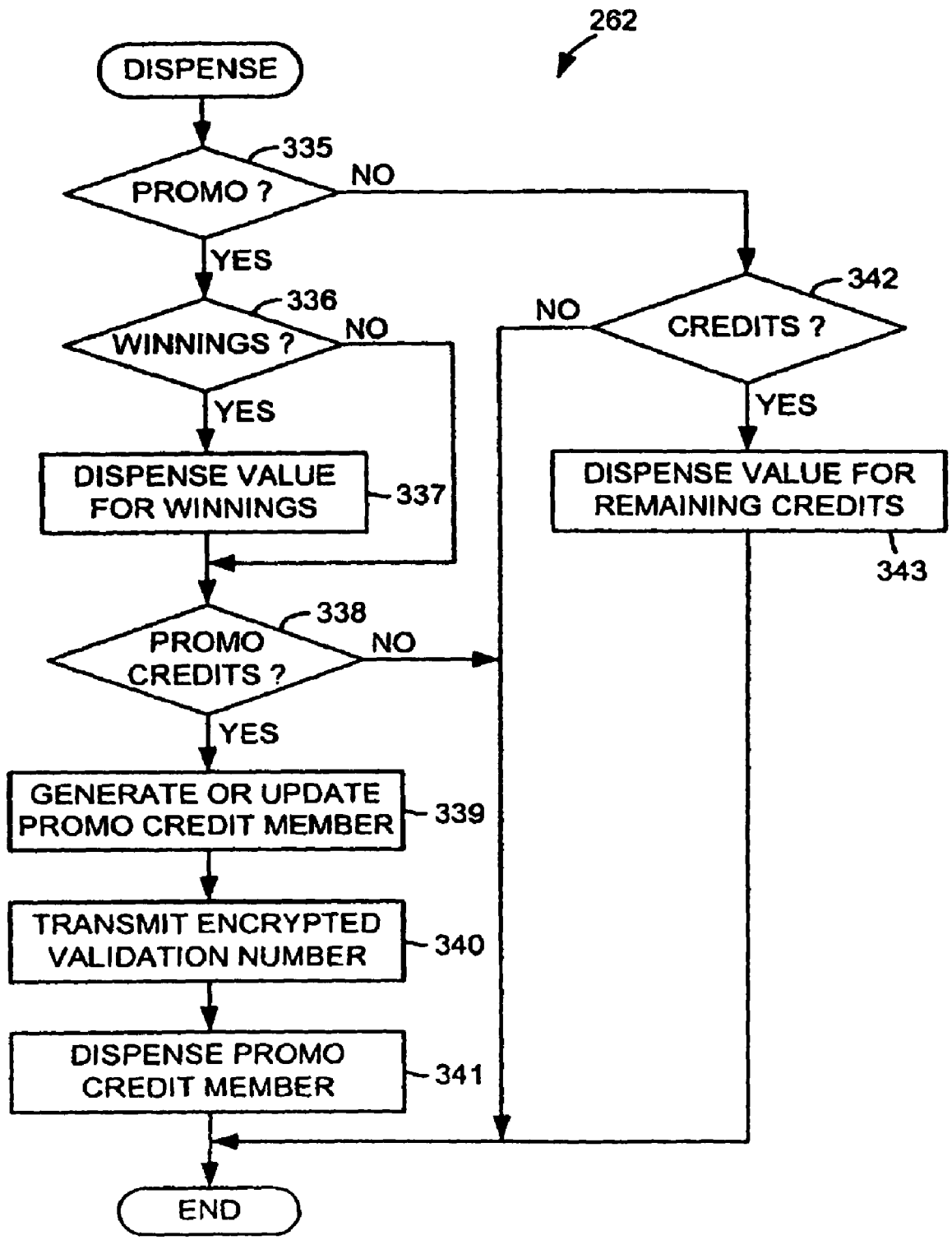
FIG. 5B is a flowchart of an embodiment of a dispense value routine that may be performed.

FIG. 5B is a flowchart of one embodiment of a dispense value routine 262 that could be performed at block 262 of FIG. 4A or at block 324 of FIG. 4B where the gaming unit 20 is designed to accept promotional credit members, such as promotional tickets or promotional cards, in addition to other forms of value such as cash.

Referring to FIG. 5B, the dispense value routine could be initiated in response to a player pressing a "Cash Out" button. At block 335, the routine could determine whether the game play which is being terminated was played with the use of a promotional credit member. That could be determined, for example, by checking the status of the "promotional" flag or variable that may have been set at block 326 (FIG. 5A). If game play was performed using promotional gaming credits, at block 336 the routine may determine whether there are any cash winnings that need to be dispensed to the player. If so, block 337 may be performed to dispense the winnings, which could be dispensed in the form of cash or in the form of a ticket that is redeemable for cash.

At block 338, the routine may determine whether there are any remaining promotional gaming credits. The gaming unit 20 may be programmed to keep track of the number of promotional gaming credits throughout game play. For example, if a player inserted a promotional ticket having 1,000 promotional gaming credits and used 200 of those credits during play of the gaming unit 20, the remaining promotional gaming credits would be 800. If there are remaining promotional gaming credits as determined at block 338, at block 339 the routine may update the promotional credit member initially inserted by the player, or generate a new promotional credit member, in order to provide the player with a promotional credit member having the remaining number of promotional gaming credits.

Where promotional tickets are used, at block 339 a new promotional ticket could be printed by the ticket reader/printer 56. The promotional ticket could be printed with a first image or image portion representing a validation number and a second image or image portion (e.g. a bar code) representing the number of remaining credits. Where promotional cards are used, at block 339 the same promotional card initially inserted by the player could be magnetically re-encoded with the card reader 58 to provide a new validation number and magnetic data representing the number of remaining promotional credits.

At block 340, the routine may cause the new validation number to be encrypted and then transmitted to a central computer, such as the network computer 22, where the new validation number may be stored in memory so that the validity of the new or updated promotional credit member can be later validated, in the manner described above, when it is later used by the player. At block 341, the new or updated promotional credit member may be dispensed to the player so that the player may use that new or updated promotional credit member to play a different gaming unit 20.

If the routine determined that promotional gaming credits were not used during game play as determined at block 335, at block 342 the routine may determine whether there are any winnings to dispense to the player and, if so, may dispense those winnings at block 343.

Video Poker

Figure 6:
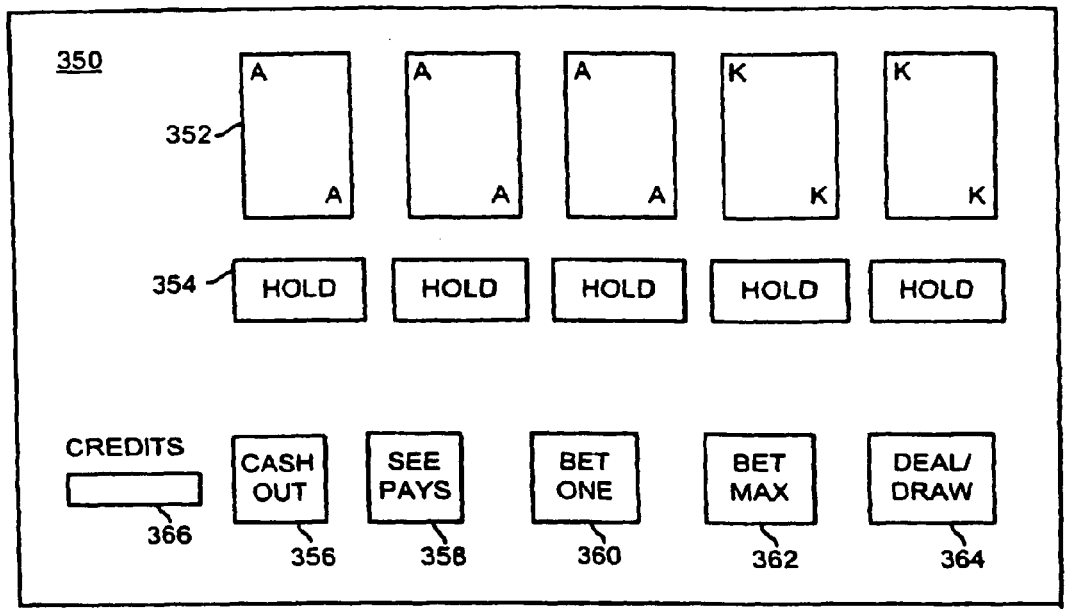
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
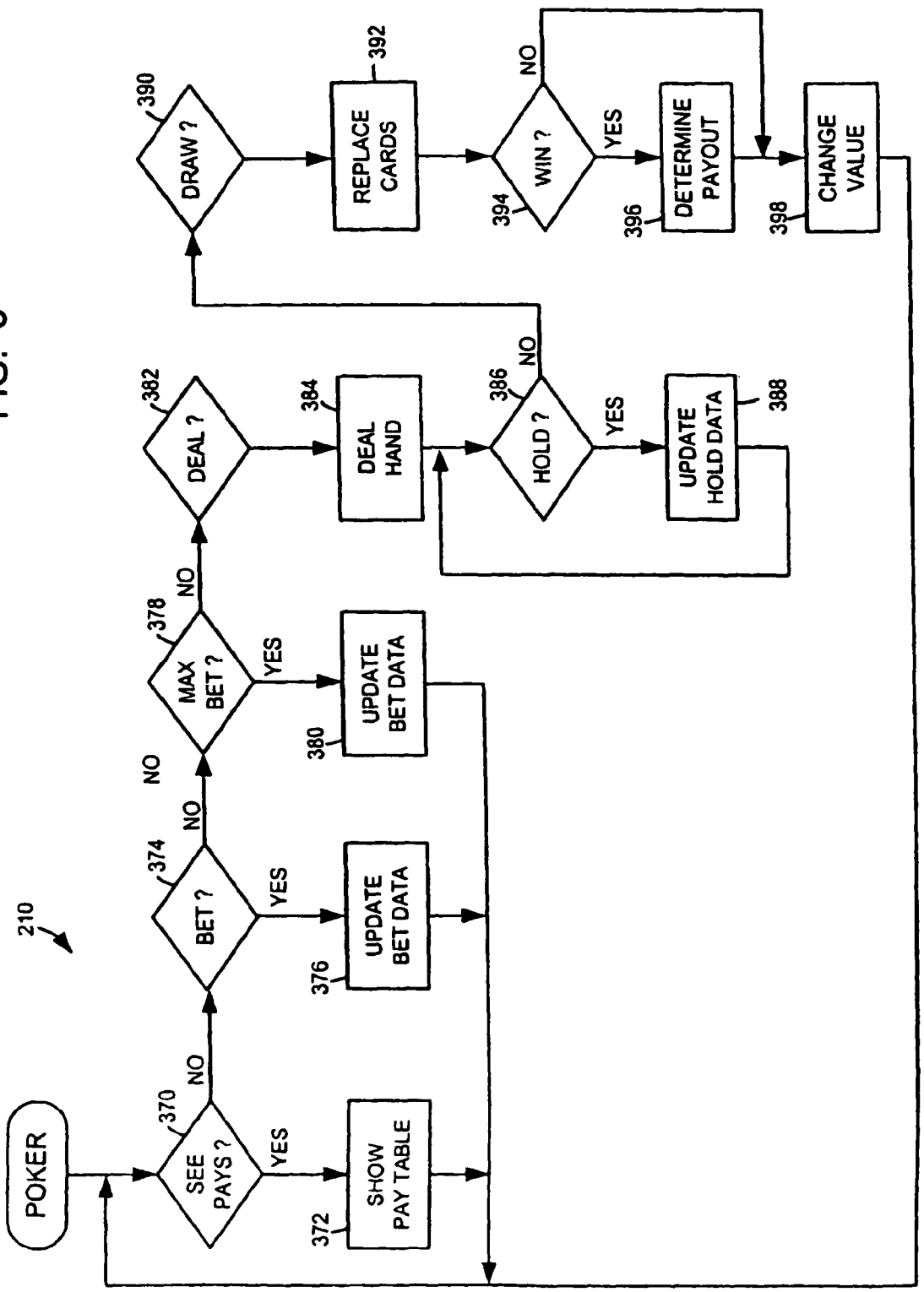
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100.

If there is a winning hand, a payout value (which may correspond to the amount won) for the winning hand may be determined at block 396. At block 398, where promotional credits are being used, the player's remaining promotional credits may be decreased by the amount of the wager for the current game, and the cumulative amount of the player's winnings may be increased by the amount won as a result of the current game. Where promotional credits are not being used, at block 398 the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
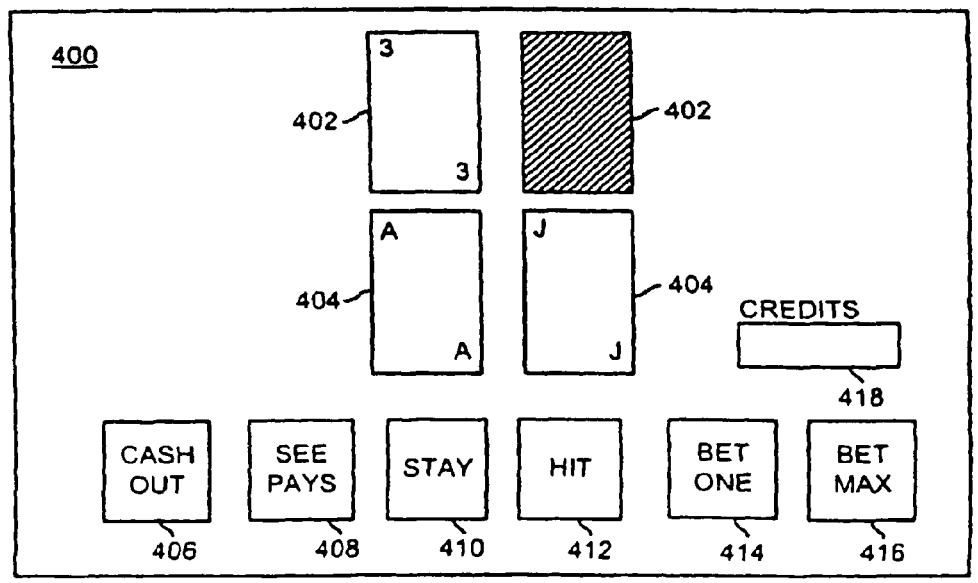
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
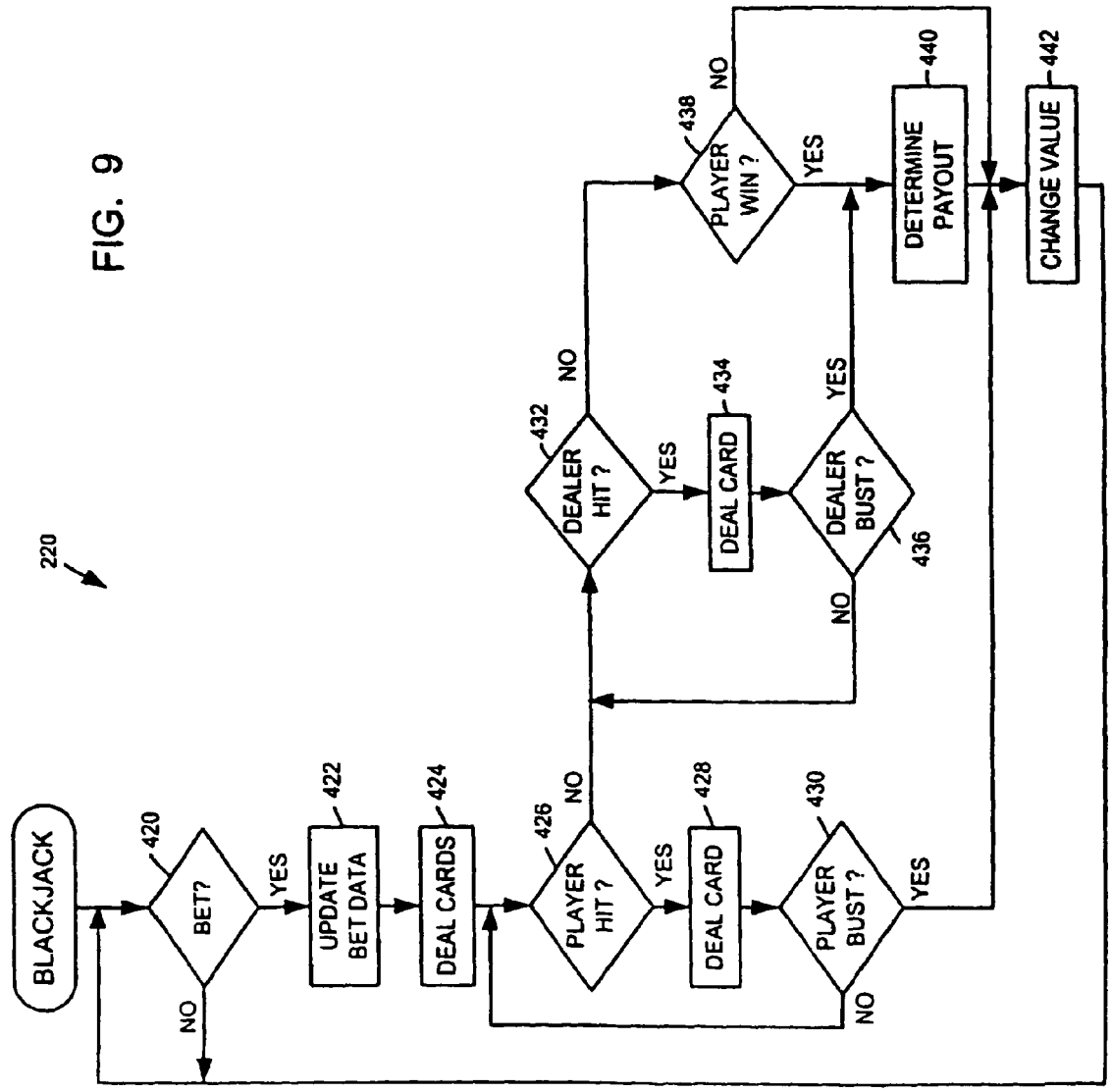
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value (which may correspond to the amount won) for the winning hand may be determined at block 440. At block 442, where promotional credits are being used, the player's remaining promotional credits may be decreased by the amount of the wager for the current game, and the cumulative amount of the player's winnings may be increased by the amount won as a result of the current game. Where promotional credits are not being used, at block 442 the player's cumulative value or number of credits may be updated by subtracting the bet made by the player and adding, if the hand was a winner, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
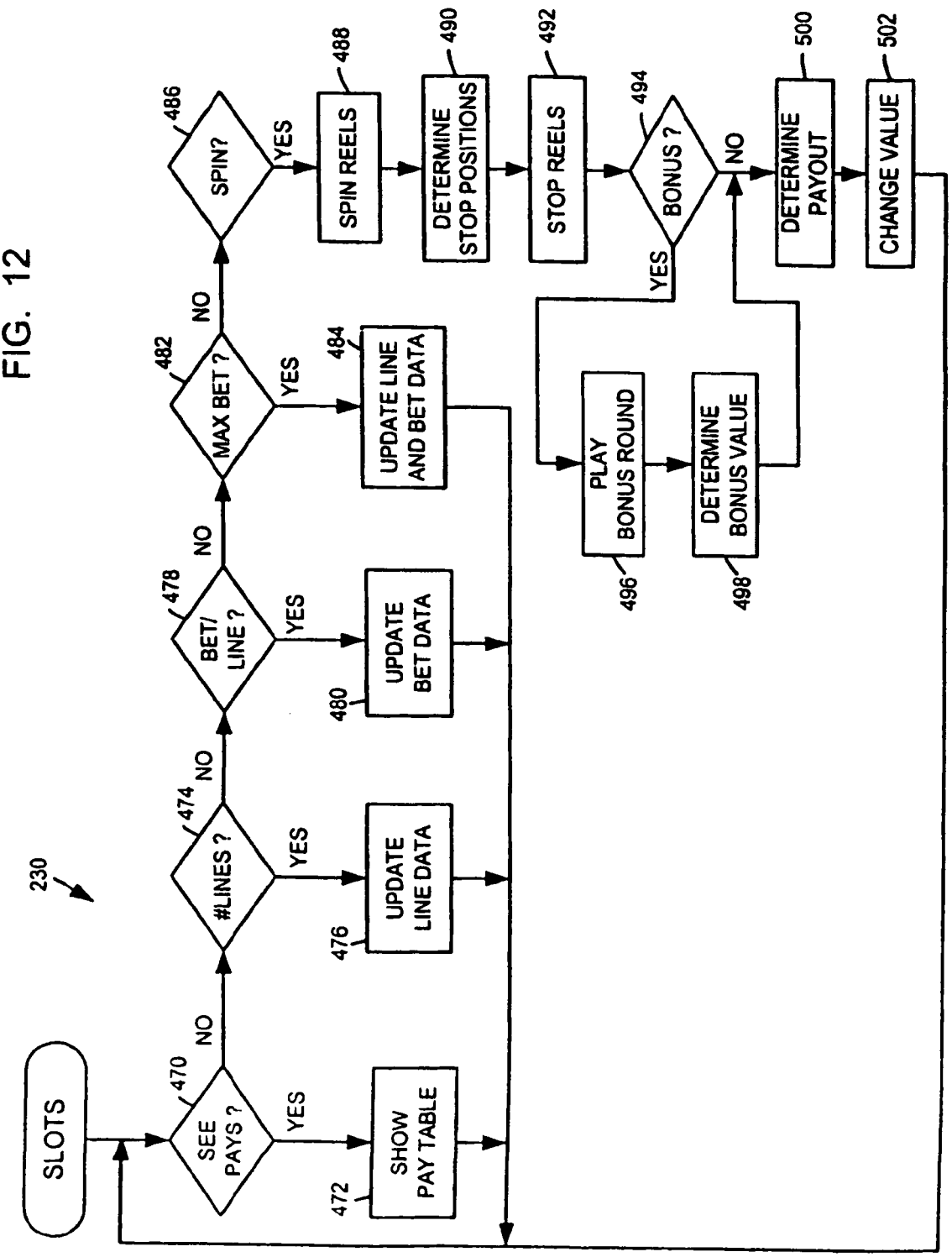
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500.

At block 502, where promotional credits are being used, the player's remaining promotional credits may be decreased by the amount of the wager for the current game, and the cumulative amount of the player's winnings may be increased by the amount won as a result of the current game. Where promotional credits are not being used, at block 502 the player's cumulative value or number of credits may be updated by subtracting the bet made by the player and adding, if the game was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
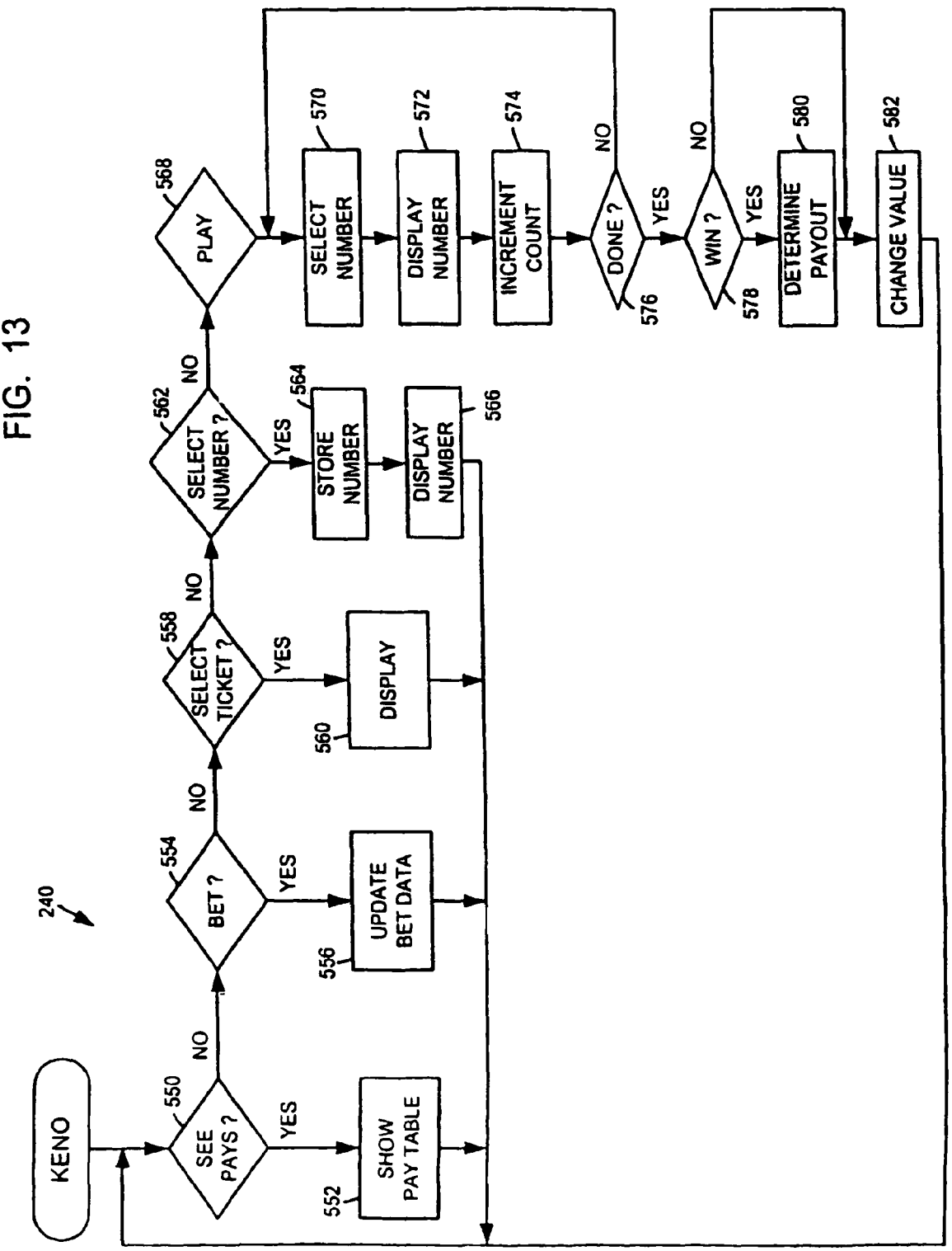
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, where promotional credits are being used, the player's remaining promotional credits may be decreased by the amount of the wager for the current game, and the cumulative amount of the player's winnings may be increased by the amount won as a result of the current game. Where promotional credits are not being used, at block 582 the player's cumulative value or number of credits may be updated by subtracting the bet made by the player and adding, if the game was a winner, the payout value determined at block 580. The cumulative value or number of credits may also be displayed in the display area 540 (FIG. 11).

Video Bingo

Figure 14:
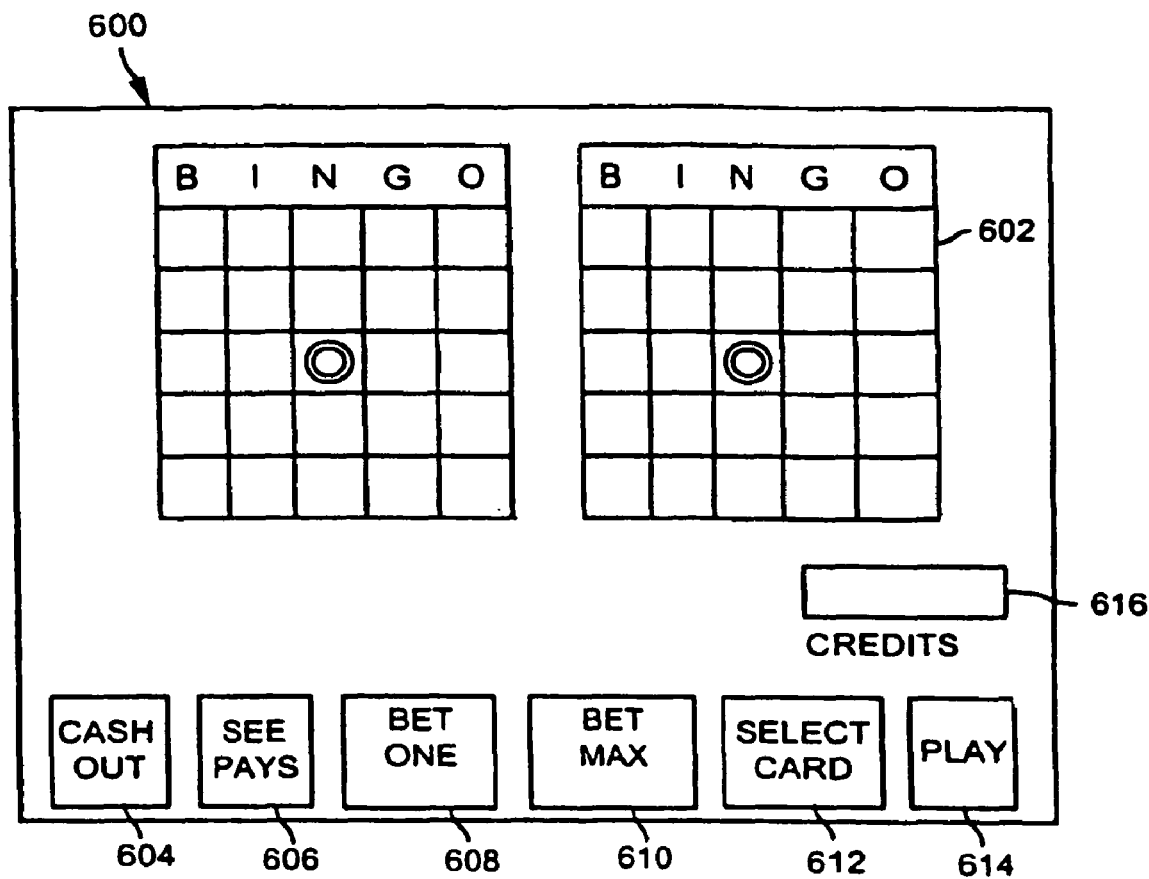
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
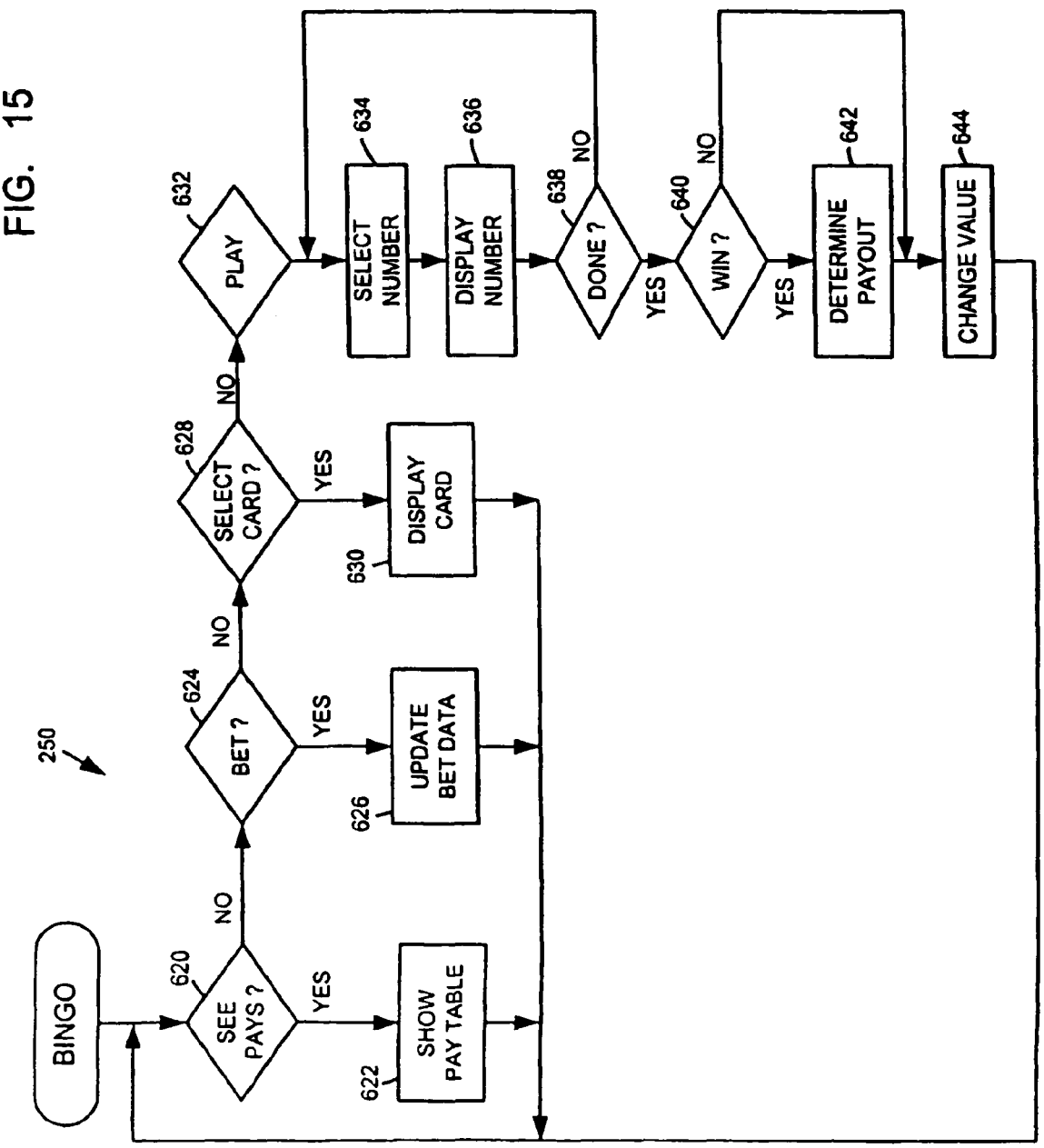
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game.

At block 644, where promotional credits are being used, the player's remaining promotional credits may be decreased by the amount of the wager for the current game, and the cumulative amount of the player's winnings may be increased by the amount won as a result of the current game. Where promotional credits are not being used, at block 644 the player's cumulative value or number of credits may be updated by subtracting the bet made by the player and adding, if the hand was a winner, the payout value determined at block 642. The cumulative value or number of credits may also be displayed in the display area 616 (FIG. 14).

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:
a display unit for displaying a game;
a ticket reader operable to at least read a first validation number and a first number of promotional gaming credits from a first promotional ticket;
a ticket printer operable to at least print a second validation number and a second number of promotional gaming credits on a second promotional ticket;
a controller operatively coupled to said display unit, said ticket reader and said ticket printer, said controller comprising a processor and a memory operatively coupled to said processor, said controller operable a) to check validity of said first promotional ticket by transmitting at least the first validation number to a central computer, b) when information is received from the central computer indicating the first promotional ticket is valid, to store in the memory the first number of promotional gaming credits; c) to receive a wager on an outcome of the game using one or more of the first number of promotional gaming credits, d) to determine a payout based on the wager and on the game outcome; e) to calculate the second number of promotional gaming credits according to at least the first number of promotional credits and the payout; f) to generate the second validation number for the second number of promotional gaming credits; g) to encrypt the second validation number; h) to transmit the second validation number to the central computer; and i) to cause the ticket printer to print the second validation number and the second number of promotional gaming credits on the second promotional ticket.

2. The gaming apparatus of claim 1 wherein said ticket reader is operable to optically read information from the first promotional ticket.

3. The gaming apparatus of claim 1 wherein controller is further operable to cause said ticket printer to print an image on the second promotional ticket that represents said second number of promotional gaming credits.

4. The gaming apparatus of claim 1 wherein controller is further operable to cause said ticket printer to print an image on the second promotional ticket that represents said second validation number.

5. The gaming apparatus of claim 1 wherein the controller is further operable to generate the second validation number.

6. The gaming apparatus of claim 1 wherein the controller is further operable to keep track of promotional credits used during game play.

7. The gaming apparatus of claim 1 wherein the display unit is a video display.

8. The gaming apparatus of claim 1 wherein the display unit is a plurality of mechanical slot reels.

9. The gaming apparatus of claim 1 wherein the controller is further operable to prevent the first number of promotional gaming credits from being dispensed as cash or in a form that is redeemable for cash.

10. The gaming apparatus of claim 1 wherein the payout comprises winnings.

11. The gaming apparatus of claim 10 wherein the gaming apparatus is operable to dispense the winnings as cash or in a form that is redeemable for cash.

12. The gaming apparatus of claim 1, wherein the controller is further operable to encrypt the first validation number prior to transmitting the first validation number to the central computer.

13. The gaming apparatus of claim 1, wherein the controller is further operable to display a list of games available for play on the display unit.

14. The gaming apparatus of claim 1, wherein the controller is further operable to cause the ticket printer to print information relating to one or more of a casino name, a type of ticket, a bar-code, a date, a time, redemption instructions, redemption restrictions, and a description of an award to a ticket.

15. A gaming system comprising:
a plurality of gaming apparatuses, each gaming apparatus comprising:
a display unit for displaying a game;
a ticket reader operable to at least read a first validation number and a first number of promotional gaming credits from a first promotional ticket;
a ticket printer operable to at least print a second validation number and a second number of promotional gaming credits on a second promotional ticket;
a controller operatively coupled to said display unit, said ticket reader and said ticket printer, said controller comprising a processor and a memory operatively coupled to said processor, said controller operable a) to check validity of said first promotional ticket by transmitting at least the first validation number to a central computer, b) when information is received from the central computer indicating the first promotional ticket is valid, to store in the memory the first number of promotional gaming credits; c) to receive a wager on an outcome of the game using one or more of the first number of promotional gaming credits, d) to determine a payout based on the wager and on the game outcome; e) to calculate the second number of promotional gaming credits according to at least the first number of promotional credits and the payout; f) to generate the second validation number for the second number of promotional gaming credits; g) to encrypt the second validation number; h) to transmit the second validation number to the central computer; and i) to cause the ticket printer to print the second validation number and the second number of promotional gaming credits on the second promotional ticket wherein the second promotional ticket, when validated, is redeemable for the second number of promotional gaming credits for game play on any of the gaming apparatuses; and
the central computer operable to validate the first promotional ticket or the second promotional ticket.

16. The gaming system of claim 15 wherein the controller is further operable to keep track of promotional credits used during game play.

17. The gaming system of claim 15 wherein the display unit is a video display.

18. The gaming system of claim 15 wherein the display unit is a plurality of mechanical slot reels.

19. The gaming system of claim 15 wherein the controller is further operable to prevent the first number of promotional gaming credits from being dispensed as cash or in a form that is redeemable for cash.

20. The gaming system of claim 15 wherein the payout comprises winnings.

21. The gaming apparatus of claim 20 wherein the gaming apparatus is operable to dispense the winnings as cash or in a form that is redeemable for cash.

* * * * *